US010338939B2

(12) United States Patent
Franck

(10) Patent No.: US 10,338,939 B2
(45) Date of Patent: Jul. 2, 2019

(54) SENSOR-ENABLED FEEDBACK ON SOCIAL INTERACTIONS

(71) Applicant: Bose Corporation, Framingham, MA (US)

(72) Inventor: Kevin Franck, Concord, MA (US)

(73) Assignee: Bose Corporation, Framingham, MA (US)

( * ) Notice: Subject to any disclaimer, the term of this patent is extended or adjusted under 35 U.S.C. 154(b) by 391 days.

(21) Appl. No.: 14/924,894

(22) Filed: Oct. 28, 2015

(65) Prior Publication Data

US 2017/0123824 A1    May 4, 2017

(51) Int. Cl.
| | |
|---|---|
| *G06Q 50/00* | (2012.01) |
| *G06F 9/451* | (2018.01) |
| *H04W 4/80* | (2018.01) |
| *G06F 3/01* | (2006.01) |
| *G06F 3/0481* | (2013.01) |
| *G10L 17/02* | (2013.01) |
| *G10L 17/08* | (2013.01) |
| *H04W 8/00* | (2009.01) |
| *H04W 4/02* | (2018.01) |

(52) U.S. Cl.
CPC .............. *G06F 9/453* (2018.02); *G06F 3/015* (2013.01); *G06F 3/0481* (2013.01); *G06Q 50/01* (2013.01); *G10L 17/02* (2013.01); *G10L 17/08* (2013.01); *H04W 4/80* (2018.02); *H04W 8/005* (2013.01); *H04W 4/02* (2013.01)

(58) Field of Classification Search
CPC .......... G10L 25/63; G10L 17/02; G10L 17/08; G06F 3/015; G06F 3/0481; G06F 9/4446; H04W 4/008; H04W 8/005; H04W 4/02; G06Q 50/01
See application file for complete search history.

(56) References Cited

U.S. PATENT DOCUMENTS

| | | | |
|---|---|---|---|
| 2011/0320536 A1* | 12/2011 | Lobb ...................... | G06Q 50/01 709/205 |
| 2012/0323087 A1* | 12/2012 | Leon Villeda ....... | A61B 5/0402 600/301 |

(Continued)

OTHER PUBLICATIONS

Olguin et al.; "Social Sensors for Automatic Data Collection"; AMCIS 2008 Proceedings; Aug. 14, 2008; 10 pages.

(Continued)

*Primary Examiner* — Jennifer N To
*Assistant Examiner* — Amy P Hoang
(74) *Attorney, Agent, or Firm* — Fish & Richardson P.C.

(57) ABSTRACT

The technology described in this document can be embodied in a computer-implemented method that includes receiving location information associated with a location of a user-device, and receiving, from one or more sensor devices, user-specific information about a user associated with the user device. The method also includes estimating, by one or more processors, based on (i) the user-specific information and (ii) the location information, a set of one or more parameters indicative of social interactions of the user. The method further includes generating a signal representing informational output based on comparing the set of one or more parameters to corresponding threshold values, and providing the signal for causing a presentation of the informational output on an output device.

35 Claims, 4 Drawing Sheets

(56) References Cited

U.S. PATENT DOCUMENTS

| | | | | |
|---|---|---|---|---|
| 2013/0095460 A1* | 4/2013 | Bishop | ............... | G09B 21/009 434/308 |
| 2014/0287387 A1* | 9/2014 | Vukasinovic | ............ | G09B 7/02 434/236 |
| 2015/0081299 A1* | 3/2015 | Jasinschi | ............... | A61B 5/165 704/246 |
| 2016/0080897 A1* | 3/2016 | Moore | .................. | H04W 4/02 340/539.13 |

OTHER PUBLICATIONS

Olguin; "Sociometric Badges: Wearable Technology for Measuring Human Behavior"; Program in Media Arts and Sciences; Jun. 1, 2007; 144 pages.

Laibowitz et al.; "A Sensor Network for Social Dynamics"; Information Processing in Sensor Networks, 2006; The fifth International Conference on Nashville, TN; Apr. 19, 2006; 9 pages.

International Search Report and Written Opinion; PCT/US2016/058610; Jan. 19, 2017; 14 pages.

Olguin et al.; "Sensor Based Organisational Design and Engineering"; International Journal of Organisational Design and Engineering; vol. 1, No. 1/2; pp. 69-97; 2010.

Olguin, et al.; "Sensible Organizations: Technology and Methodology for Automatically Measuring Organizational Behavior"; IEEE Transations on Systems, Man, and Cybernetics—PartB: Cybernetics; vol. 39, No. 1, 13 pp.; Feb. 2009.

Orbach, et al.; "Sensing Informal Networks in Organizations"; American Behavioral Scientist; 17 pp.; Nov. 21, 2014.

Waber et al.; "Understanding Organizational Behavior with Wearable Sensing Technology"; Academy of Management Annual Meeting; Anaheim, CA; 36 pp.; Aug. 2008.

Wu et al.; "Mining Face-to-Face Interaction Networks using Sociometric Badges: Predicting Productivity in an IT Configuration Task"; In Proceedings of the International Conference on Information Systems; Paris, France; 19 pp.; Dec. 14-17, 2008.

Tripathi et al.; "Predicting Creativity in the Wild: Experience Sample and Sociometric Modeling of Teams"; In Proceedings of the ACM Conference on Computer Supported Cooperative Work; Seattle, WA; 10 pp.; Feb. 11-15, 2012.

Olguin et al.; "Capturing Individual and Group Behavior with Wearable Sensors"; Human Behavior Modeling, AAAI Spring Symposium; Palo Alto, CA; 7 pp.; Mar. 2009.

Olguin et al.; "Assessing Group Performance from Collective Behavior"; Submitted to: CSCW 2010 Workshop on Collective Intelligence in Organizations; Savannah, GA; 6 pp.; Feb. 6, 2010.

Kim et al.; "Meeting Mediator: Enhancing Group Collaboration and Leadership with Sociometric Feedback"; In Proceedings of the ACM Conference on Computer Supported Cooperative Work; San Diego, CA; 10 pp.; Nov. 2008.

Pentland; "To Signal is Human"; American Scientist; vol. 98, No. 3; 9pp.; May-Jun. 2010.

Pentland et al.; "Computational Social Science"; Science; vol. 323, 3 pp.; Feb. 2009.

Screenshots from the website of Sociometric Solutions (http://www.sociometrisolutins.com/); Downloaded on Oct. 28, 2015.

* cited by examiner

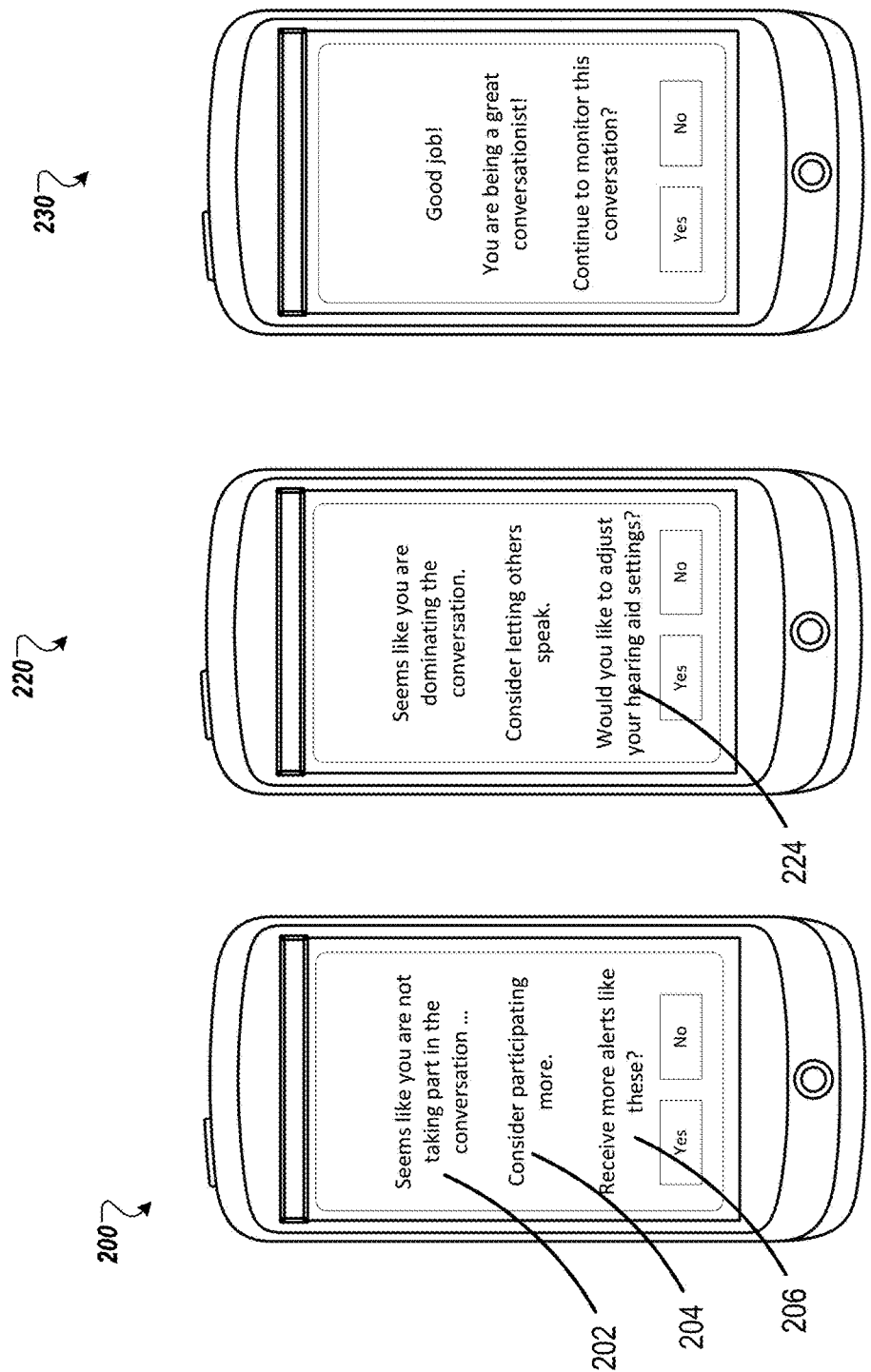

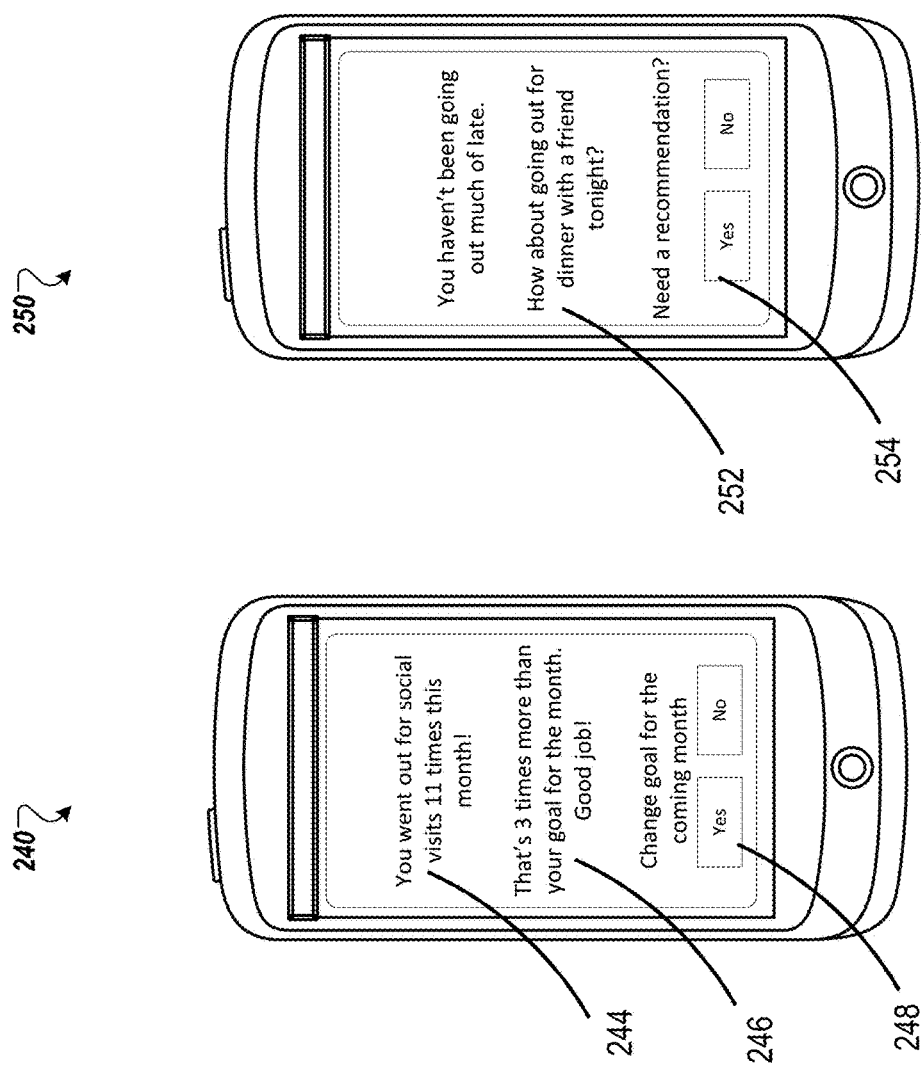

SENSOR-ENABLED FEEDBACK ON SOCIAL INTERACTIONS

TECHNICAL FIELD

This disclosure generally relates to providing automatic informational output (e.g., feedback) on social interactions of a user with one or more other individuals, via connected devices of the user. The feedback can be provided, for example, to a user of a hearing assistance device, such that the user can change/maintain an extent or type of his or her social interactions based on the feedback.

BACKGROUND

Physical and/or mental disabilities often affect a person's social interactions. For example, individuals suffering from hearing losses may be prone to a risk of isolating themselves from other people around them. Even when a person is using a hearing aid, the tendency of social isolation may persist, which may be attributed to, for example, perceived embarrassments associated with using hearing aids.

SUMMARY

In one aspect, this document features a computer-implemented method that includes receiving location information associated with a location of a user-device, and receiving, from one or more sensor devices, user-specific information about a user associated with the user device. The method also includes estimating, by one or more processors, based on (i) the user-specific information and (ii) the location information, a set of one or more parameters indicative of social interactions of the user. The method further includes generating a signal representing informational output based on comparing the set of one or more parameters to corresponding threshold values, and providing the signal for causing a presentation of the informational output on an output device.

In another aspect, this document features a system that includes an analysis engine having one or more processing devices. The analysis engine is configured to receive location information associated with a location of a user-device, and receive, from one or more sensor devices, user-specific information about a user associated with the user device. The analysis engine is also configured to estimate, based on (i) the user-specific information and (ii) the location information, a set of one or more parameters indicative of social interactions of the user. The analysis engine is further configured to generate a signal representing informational output based on comparing the set of one or more parameters to corresponding threshold values, and provide the signal for causing a presentation of the informational output on an output device.

In another aspect, this document features one or more machine-readable storage devices having encoded thereon computer readable instructions for causing one or more processors to perform various operations. The operations include receiving location information associated with a location of a user-device, and receiving, from one or more sensor devices, user-specific information about a user associated with the user device. The operations also include estimating, by one or more processors, based on (i) the user-specific information and (ii) the location information, a set of one or more parameters indicative of social interactions of the user. The operations further include generating a signal representing informational output based on comparing the set of one or more parameters to corresponding threshold values, and providing the signal for causing a presentation of the informational output on an output device.

In various implementations, the aspects of the technology described above can include one or more of the following features.

The location information can include information representing a number of individuals interacting with the user at the location. The user-specific information can include information on dynamics of a conversation between the user and one or more individuals interacting with the user. The information on the number of individuals can be obtained based on detecting a presence of one or more devices associated with at least a subset of the individuals. The presence of one or more devices can be detected based on one or more wireless signals received from the one or more devices. The one or more wireless signals can include a Bluetooth® signature of a corresponding device. The set of one or more parameters indicative of social interactions of the user can include a metric of speech intelligibility of the user. Determining the metric of speech intelligibility can include performing speech recognition on utterances by the user, identifying, from at least a portion of the recognized speech, a number of occurrences of one or more predetermined phrases that are indicative of difficulty in understanding speech, and determining the metric of speech intelligibility as a function of the number of occurrences of the one or more predetermined phrases. The location information can include a sound pressure level (SPL) at the location. The set of one or more parameters indicative of social interactions of the user can include a participation metric indicative of a level of participation of the user in a conversation with one or more individuals. The participation metric can include determining a first metric indicating an amount of time that the user speaks during a predetermined time period, determining a second metric indicating an amount of time for which the one or more of the individuals speak during the predetermined time period, and estimating the participation metric as a function of the first metric and the second metric. The participating metric can be compared to a threshold value in estimating the set of one or more parameters indicative of the social interactions of the user. Estimating the set of one or more parameters indicative of the social interactions of the user can include obtaining one or more metrics representing a physiological condition of the user, and estimating the set of one or more parameters based also on the one or more metrics. The one or more metrics representing the physiological condition of the user can include one or more of: a heart rate, a heart rate variability, an electrocardiogram (EKG) metric, an electroencephalogram (EEG) metric, body temperature, galvanic skin resistance (GSR), and one or more metrics associated with a motion of the user. The set of one or more parameters indicative of the social interactions of the user can include at least one parameter indicative of a stress level of the user. The set of one or more parameters indicative of the social interactions of the user can include at least one parameter indicative of an engagement level of the user. The informational output can include one or more instructions for the user. The informational output can include one or more of: an audio, a video, an image, text, or a haptic feedback. The output device can include one of: a smartphone, a tablet device, a wearable device, or a hearing-assistance device. The set of one or more parameters indicative of the social interactions of the user can be stored on a storage device, wherein the set of one or more parameters is linked with the location information.

Various implementations described herein may provide one or more of the following advantages.

Individuals who are aware of the social risks of isolation stemming from a disability (e.g., hearing loss) can use the technology described herein to track and/or modify their social interactions. Various aspects of social interactions such as conversation dynamics, frequency of going out, and characteristics of the social settings can be automatically derived and tracked using sensors disposed on various user devices. The informational output signal can be used by an individual to understand, maintain, and/or change his or her social behavior, for example, to conform to a personal goal or established norms. In some cases, this may lead to beneficial social, psychological, cognitive, and/or health effects, thereby leading to overall well-being of the individual. In some cases, caregivers (e.g., a parent, spouse, or healthcare provider) may be permitted to monitor and understand social interactions of an individual, and provide more personalized care or advice accordingly. The technology can be used as a basis of a reward program directed to, for example, incentivizing a particular type of social behavior.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DESCRIPTION OF THE DRAWINGS

FIGS. 2A-2E show examples of user interfaces for providing informational output on a user's social interactions.

DETAILED DESCRIPTION

Figure 1:
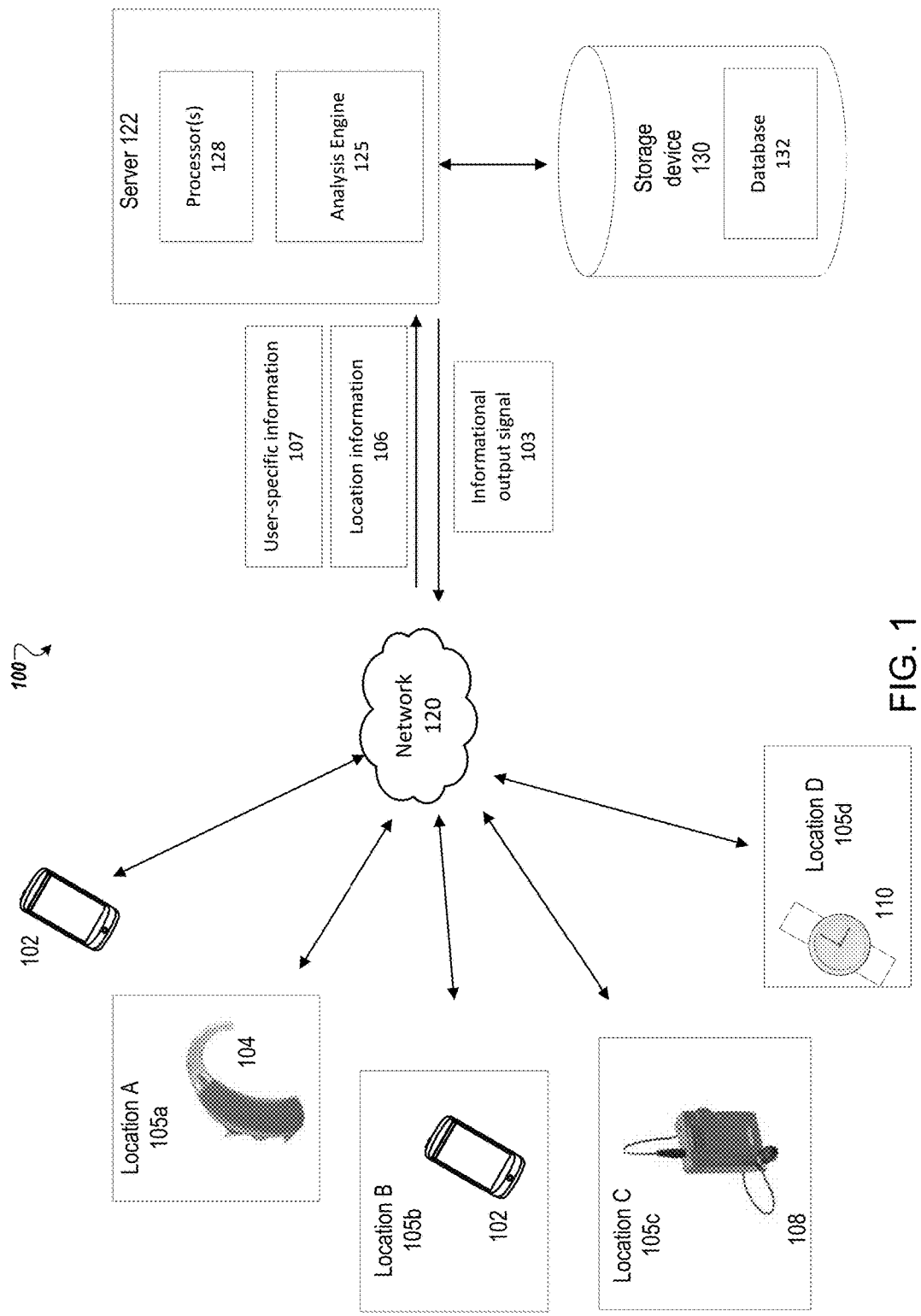
FIG. 1 is a diagram showing an example of an environment for providing predictions of ambient acoustic features.

An individual's social interactions and engagements are often affected by disabilities or chronic illnesses. For example, a person suffering from hearing loss may, knowingly or unknowingly, avoid social interactions that require listening and responding to other people. In some cases, this can happen unknowingly because hearing loss often occurs gradually, and affected individuals often take a long time in realizing and/or accepting that they have hearing loss. Even when individuals are diagnosed with hearing loss, in some cases they may be resistant to using hearing aids, possibly because of incorrect and preconceived notions about embarrassment associated with using hearing aids. In situations like the above, impaired hearing may result in impaired communications, thereby leading to social anxiety, withdrawal, and ultimately a constricted lifestyle. This can in turn affect the general well-being of the individuals, and may result in permanent or long-term changes in their social behavior.

While hearing assistance devices (e.g., hearing aids, personal amplifiers etc.) address hearing loss issues, such devices may not always directly help in improving social interactions of the users. For example, even when a user starts using hearing aids, the user may continue to be afflicted with social interaction issues associated with hearing loss. In some cases, such social interaction issues may have developed over many years, and could therefore be challenging to overcome simply by using hearing assistance devices. In another example, the very fact that an individual is wearing a hearing aid can affect the individual's social interactions because the individual may not want other people to learn about his/her disability.

Impaired social interactions may be manifested in various ways. In some cases, a hearing-aid user may withdraw from conversations or social interactions in keeping with habits developed over many years of not using hearing aids. In other cases, a hearing-aid user may tend to talk more than he/she normally would, for example, to avoid situations where he or she would have to listen and respond to other people. In some cases, a hearing-aid user may tend to avoid social visits or engagements. The hearing aid users may engage in such behavior with or without realizing that the behavior could be perceived by some as non-conforming to established social norms. In such cases, providing the users informational output on their social interactions can help the users adjust their interactions, such that their interactions better conform to a predefined goal and/or a quantifiable standard of social norms. This in turn may improve social interactions of the user over time, thereby mitigating one or more of social, psychological, cognitive and health effects of hearing loss.

The technology described in this document can be used to provide automatic informational output on social interactions, for example, via a mobile or wearable device of a user. The social interactions can be quantified, for example, by estimating one or more metrics representing contexts and natures of the interactions based on information collected using sensors disposed on one or more user devices. The estimated metrics can then be compared against predetermined values or ranges (e.g., representative of personal goals or quantifiable standards of social norms) to provide the informational output to the user. The informational output can notify the user of any deviation from the predetermined values or ranges such that the user may adjust his/her behavior to reduce the deviation. This document describes the subject technology primarily using examples of informational output provided to users of hearing aids. However, the technology may be used for providing informational output on social interactions of a user in various other situations, such as where the user is afflicted with other physical, psychological, cognitive, or social disabilities or challenges. The technology may also be used for providing informational output to users who do not suffer from any particular illness or disability, but want to change their social interactions towards a predetermined standard or goal.

FIG. 1 shows an example environment 100 for generating and presenting informational output on social interactions of one or more individuals. The environment 100 includes a computing device (such as the server 122) that includes an analysis engine 125. The analysis engine 125 is configured to generate one or more informational output signals 103 for example, based on location information 106 and/or user-specific information 107, as received from one or more user devices. The acoustic information (e.g., the time-specific information 107 and/or the location-specific information 106) may be obtained from various sources. Examples of user devices can include a handheld device 102 such as a smartphone, a tablet, an e-reader, or a media playing device. The user devices can also include hearing assistance devices such as a hearing aid 104 or a personal amplifier 108. The user devices can also include wearable devices 110 such as a wireless-enabled watch or a fitness tracker, or a social sensor device such as a sociometric badge described in the publication: Olguin and Pentland, *Social Sensors for Auto-*

*matic Data Collection*, Proceedings of the Fourteenth Americas Conference on Information Systems, Toronto, ON, Canada Aug. 14-17, 2008, the content of which is incorporated herein by reference. The user devices can be configured to communicate, for example, over a network 120, with a remote computing device such as the server 122. In some implementations, at least a portion of the functionalities of the server 122 can be implemented on a local computing device such as a laptop or desktop computer, or a handheld device. The server 122 (or the local computing device) can include one or more processors or processing devices 128.

The location information 106 can include various types of information about the locations 105a, 105b, 105c, 105d, etc. (105 in general). For example, the location information 106 can include information on where a user is, what the acoustic characteristics are of the location, and/or number of individuals at the location. The location information can be in the form of, for example, GPS information determined by a user device, or location information provided by the user (e.g., location information provided via a social networking website). In some implementations, the location-specific information 106 can include information on an acoustic environment of a corresponding location 105. For example, the location-specific information can include information on various acoustic features (e.g., sound level, reverberation, or power spectrum of ambient noise) of the environment at the various locations 105, and/or other non-acoustic features (e.g., a type of location). The information on the various acoustic features can include, for example, various spectral, temporal, or spectro-temporal statistics, including, for example, overall sound pressure level (SPL), variation in sound pressure level over time, sound pressure level in a number of frequency bands, variation of level in each band over time, the estimated signal-to-noise ratio, the frequency spectrum, the amplitude modulation spectrum, cross-frequency envelope correlations, cross-modulation-frequency envelope correlations, outputs of an auditory model, speech transmission index (STI), and/or mel-frequency cepstral coefficients. The acoustic information can also include information identifying a presence of one or more acoustic sources of interest (e.g., human speakers), or acoustic sources of a predetermined type (e.g., background music).

In some implementations, the acoustic information can be directly measured by corresponding user devices. For example, with appropriate user-permission, a user device such as a smartphone 102, a hearing aid 104, or a personal amplifier 108, can be used to measure SPL at corresponding locations 105. In some implementations, the acoustic information can be derived from one or more other parameters measured by the user devices. For example, SPL information can be derived from a recording of ambient sounds, as obtained using a smartphone 102. In some implementations, the user devices can be configured to measure an estimated reverberation time at the corresponding locations.

The acoustic information obtained for various locations can include time-specific information. The time-specific portion of the acoustic information can have associated with it, one or more parameters that link the acoustic information to a particular time point or period of time. For example, the time-specific information can include a time stamp, which links the corresponding acoustic information to, for example, a time of the day, a day of the week, or a month. The acoustic information can also have associated with it, one or more parameters that link the acoustic information to a particular location or type of location. For example, the location-specific information 106 can include one or more identifiers that identify a location type (e.g., a restaurant, the user's home, a stadium, or a concert hall) for the corresponding locations. In some implementations, the acoustic information can be used to determine a proportions of time the user is in a noisy and quiet environments.

The location specific information 106 can be obtained with various degrees of granularity. In some implementations, the location associated with the acoustic information can be determined based on global positioning system (GPS) coordinates associated with the user device. In some implementations, a plurality of candidate locations can be presented via a user interface (e.g., on a smartphone), and a user can be asked to select the most accurate location. In some implementations, a cellular network or a local network (e.g., a Bluetooth® network or Wi-Fi network) can be used in identifying locations with a high degree of resolution. For example, information from a Wi-Fi network (also referred to as Wi-Fi sniffing) can be used (possibly in conjunction with GPS data) to determine where a user may be located within a particular building, structure, or location. In such cases, the acoustic information can be linked to different parts of the corresponding location, for example, to determine the location of the user with high precision. Resolution of the location can also be improved, for example, based on user-inputs received via the user devices. For example, when selecting the most accurate location from a plurality of choices, a user can be asked to identify a sub-part of the corresponding location.

In some examples, the location-specific information 106 includes information on a number and/or type of individuals present in a vicinity of the user. For example, Bluetooth® sniffing can be used, for example, to estimate the number of people in the vicinity of the user, or determine a density of people in the area. In some implementations, Bluetooth® signatures from devices may be used to track which individuals are present near the user. In some implementations, the analysis engine 125 may use this information to determine, for example, if these individuals are the ones that the user typically hangs out with, or if they are new associates. The analysis engine 125 can also be configured to use the location information 106 to determine, for example, if there is there a lot of time-variation in the number and/or type of signatures (representing, for example, that the user is in a crowded place such as a mall) or if the signature set is substantially constant (representing, for example, a more static setting such as a gathering of a particular set of individuals). In some implementations, location data associated with Bluetooth® signatures may be tracked over a time period to identify, for example, one or more individuals that the user is in proximity to during that time period. In some implementations, Bluetooth® signatures of individuals can be analyzed by the analysis engine 125 to determine one or more attributes about a social circle of a user. For example, the information can be used to identify one or more regular signatures associated with the user, frequencies with which such signatures are in the vicinity of the user, and/or times at which such signatures are in the vicinity of the user.

The user-specific information 107 can include various types of information that may be affected by the social interactions of the user. For example, the user-specific information 107 can include various physiological parameters associated with a stress level of the user. The physiological parameters can be used by the analysis engine to determine, for example, how engaged the user is in a particular environment, or whether or not they are feeling increased stress (e.g., over a predefined baseline). Examples of the physiological parameters can include heart rate, heart rate variability, electrocardiogram (EKG), electroencephalogram (EEG), body temperature, and galvanic skin resistance (GSR). In some implementations, the physiological parameters can include motion data associated with body motion and/or motion of the limbs or head. The physiological parameters can be sensed, for example, using one or more sensors disposed in the user devices. For example, motion sensors such as accelerometers disposed in the user devices (e.g., smartphones, hearing assistance devices, or wearable devices) can be used for sensing hand waving. Sensors disposed in wearable devices or hearing assistance devices can be used for head tracking or gaze tracking. Sensors disposed in wearable devices such as watches or fitness trackers can be used for sensing one or more of heart rate, heart rate variability, EKG, EEG, body temperature, and GSR.

The user-specific information 107 can also include one or more parameters representing the user's communications (e.g., conversations) with other individuals in social settings. In some implementations, this can include portions of the location-specific information 106 such as Bluetooth® signatures of individuals that is used, for example, to identify people who interact with the user in the social settings. In some implementations, the user-specific information 107 includes parameters representing conversation dynamics associated with a user's conversations in social settings. Examples of such parameters can include information identifying whether the user speaks more or less frequently in noisy environments relative to quiet environments, or whether the user speaks more or less frequently as the number of known signatures changes. Examples can also include a representation of the user's baseline for speaking in certain types of environments, and whether the baseline change over time (for example, in the vicinity of a given individual or individuals).

The analysis engine 125 can be configured to determine one or more parameters representing conversation dynamics of a user based at least on a portion of the location-specific information 106 and/or the user-specific information. In some implementations, the analysis engine 125 can be configured to derive the conversation dynamics parameters, for example, based on determining a number of participants in a conversation, and detecting a percentage of time the user contributes to the conversation. The number of participants N in the conversation can be determined or estimated in various ways, including, for example, manually via user input, by using gaze tracking or using head-mounted accelerometers to estimate a number of discrete head positions as a proxy to participants in a conversation, or by using Bluetooth® sniffing to quantify the number of Bluetooth radios within a vicinity of the user. The percentage contribution of the user can be estimated, for example, by estimating an amount of time $T_u$ that the user is talking in a conversation, and an amount of time $T_o$ that others are talking in the conversation. The parameters $T_u$ and $T_o$ can be estimated, for example, based on inputs from sensors such as microphone(s) placed in contact with or in close proximity to the user, for example, in one or more user devices. The inputs from such sensors can be processed by the analysis engine 125, for example, using voice detection and spectral analysis, to identify speech from different individuals, and to estimate the parameters $T_u$ and $T_o$. The portion of the conversation that the user actually contributes to ($C_a$) and the portion that the user is expected to contribute to ($C_i$) can then be calculated as:

$$C_a = (T_u/(T_u+T_o)) \quad (1)$$

$$C_i = 1/N \quad (2)$$

In some implementations, if $$C_a - C_i > Z \text{ (where } Z \text{ is a tolerance level for a typical conversation)} \quad (3)$$

the user is determined to be contributing too much to the conversation. Conversely, if $$Ca - Ci < -1*Z \quad (4)$$

the user is determined to be not contributing enough to the conversation. The tolerance Z can be determined or estimated in a variety of ways, including, for example, based on a default value, based on a user-input, or based on an estimate for a given standard. Such an estimate can be determined, for example, based on a combination of acoustic analysis, voice detection, and/or location data. If neither equation (3) nor equation (4) is satisfied, the user can be determined to be contributing to a conversation in accordance with the standard being used.

In some implementations, the user-specific information 107 can include one or more parameters indicative of a speaker's speech intelligibility, which the analysis engine 125 can use to determine whether the user is having difficulty in following a conversation. Such an intelligibility parameter can be determined, for example, based on detecting occurrences of one or more user-spoken words or phrases that indicate diminished speech intelligibility. For example, the analysis engine 125 can be configured to implement a speech detection process that detects phrases such as "what?", "can you repeat that?", "huh?", or other phrases typically used in asking someone to repeat something, and keep a count of such occurrences. If the number of occurrences exceeds a threshold over a given period of time, the analysis engine 125 can be configured to determine that the user is having speech intelligibility issues. In such cases, the informational output signal 103 can include a prompt or instruction for the user to adjust the settings for the corresponding hearing-assistance device. In some implementations, the analysis engine 125 can be configured to generate an informational output signal 103 that includes one or more control signals for automatically adjusting the gain and/or directivity of the hearing assistance device.

In some implementations, the analysis engine 125 can be configured to determine one or more metrics representing whether the user is going out for social visits and outings. This can include determining, for example, if the user is going out with known associates or friends (identified, for example, via Bluetooth® signatures), leaving his/her house outside of work hours, or visiting places conducive for social interactions. Such metrics can also include a number of days that a user goes out for social visits or outings. In some implementations, the analysis engine 125 can be configured to determine, as a metric representing a user's social outings, an extent of a user's whereabouts. For example, assuming D to be a 95% confidence interval of the standard deviation of GPS coordinates associated with the user's whereabouts, a small D may indicate that the user stays in one place, whereas a large D can indicate that the user moves around. The parameter D can be absolute or relative. Absolute D may be represented as $D_a$, and may represent, for example, the user's propensity to move relative to groups. If the user's $D_a$ is larger than a group average of a group that the user belongs to, the analysis engine may be configured to determine that the user gets out more than other individuals in the group. Conversely, a relative D may be represented as $D_r$, and may represent a propensity to move around relative to past behavior. If the user's $D_r$ is increasing over time, the analysis engine can be configured to determine that the user may be going out more than before.

In some implementations, the analysis engine 125 can be configured to sample GPS coordinates over time to calculate the following:

$$dX_n = X_n - \overline{X} \quad (5)$$

$$dY_n = Y_n - \overline{Y} \quad (6)$$

wherein $X_n$ denotes periodically sampled GPS X coordinates over a fixed analysis window of N samples, and $Y_n$ denotes periodically sampled GPS Y coordinates over a fixed analysis window of N samples. The analysis engine 125 can be further configured to compute the standard deviations of the dX and dY as:

$$\sigma_x = \sqrt{\frac{1}{N}\sum_{i=1}^{N}(dX_i - \mu)^2} \quad (7)$$

$$\sigma_y = \sqrt{\frac{1}{N}\sum_{i=1}^{N}(dY_i - \mu)^2} \quad (8)$$

The analysis engine is further configured to compute a radius that contains 95% of the data points as:

$$2DRMS = 2\sqrt{\sigma_x^2 + \sigma_y^2} \quad (9)$$

Whether or not the user is moving around can then be determined based on the quantity calculated using equation (9). In some implementations, if the quantity 2DRMS is greater than D, the analysis engine 125 can be configured to determine that the user is satisfactorily engaging in social visits.

In some implementations, the analysis engine 125 can be configured to determine, as a metric representing a user's social outings, an extent of variation in SPL at the various locations that the user visits. For example, assuming V to be a variation in loudness, a small V may indicate that the user stays in one place or type of place, whereas a large V can indicate that the user visits locations with diverse or variable sound levels. The parameter V can be absolute or relative. Absolute V may be represented as $V_a$, and may represent, for example, the user's propensity to visit different places relative to groups. Conversely, a relative V may be represented as $V_r$, and may represent a propensity to visit different places relative to past behavior.

In some implementations, the analysis engine 125 can be configured to receive sample SPL levels at various locations over time to calculate the following:

$$dSPL_n = SPL_n - \overline{SPL} \quad (10)$$

wherein $dSPL_n$ denotes periodically sampled SPL levels over a fixed analysis window of N samples, and $\overline{SPL}$ denotes an average over the N samples. The analysis engine 125 can be further configured to compute the standard deviations of dSPL as:

$$\sigma_x = \sqrt{\frac{1}{N}\sum_{i=1}^{N}(dSPL_i - \mu)^2} \quad (11)$$

Whether or not the user is moving around can then be determined based on the quantity calculated using equation (9). In some implementations, if the quantity $\sigma_x$ is greater than V, the analysis engine 125 can be configured to determine that the user is satisfactorily engaging in social visits.

In some implementations, the analysis engine 125 can be configured to derive one or more metrics of social interactions based on at least a portion of the physiological data, location-specific information 106, and/or other user-specific information. For instance, physiological data such as hand movement may be correlated with speech detection to determine an engagement level of the user. In one example, if the user is detected to use significant amount of hand motions during speaking, the analysis engine 125 could be configured to determine a high level of engagement and/or interest in the corresponding social interaction. Conversely, if the user does not use any hand or head movements during speaking, the analysis engine 125 may determine that the user's engagement level and/or interest in the corresponding social interaction is not high. Engagement or interest levels can also be estimated, for example, using physiological data such as heart rate, heart rate variability, EKG, EEG, and/or body temperature. In some implementations, engagement or interest levels can also be estimated based tracking head motions or gaze direction. For example, if a user is determined to be looking at a speaker during a conversation, the analysis engine may be configured to estimate a high level of engagement. On the other hand, if a user is estimated to look away or shift gaze direction intermittently, the analysis engine 125 can be configured to estimate a relatively low level of engagement or interest.

In some implementations, the user-specific information 107 can include information on the user's TV watching behavior. This can include detecting, for example, using sensors disposed on one or more user devices, a volume level of the TV that the user is exposed to relative to set norms, and tracking changes over time. The analysis engine 125 can be configured to use the information on TV watching behavior to determine, for example, identity of one or more individuals watching TV with the user, location of the TV within the environment of the user, and whether conversations occur during watching TV. The identity of the one or more individuals can be determined, for example, by identifying corresponding Bluetooth® signatures, or possibly via a speaker recognition process. The speaker recognition process can also be configured to separate human conversations from TV sounds. A location of the TV can be determined, for example, using gaze detection. For example, in the absence of any conversation, the user's gaze direction can be identified to estimate the location of the TV. This information may be used by the analysis engine 125, for example, to separate the TV location from the location of other individuals in the room.

The user-specific information 107 and/or the location specific information 106 obtained from various user devices may be stored on a storage device 130 accessible by the analysis engine 125, for example, as a database 132, and used in generating the one or more recommendations for different users. For example, user's usage of hearing assistance devices at various locations can be tracked and stored in the database, and subsequently analyzed by a machine learning process. Once trained, the machine learning process can be used for recommending, for example, locations and/or time for social interactions for various users. For example, if a user experienced difficulties in his/her social interactions at a particular restaurant environment (as manifested, for example, by the user's difficulty in communicating with other individuals, withdrawing from communications, or experiencing high stress during communications), a similar restaurant or environment would not be recommended to the user. In some cases, such an environment may be recommended only on certain days or at certain times.

Based on at least a portion of the location-specific information 106 and/or the user-specific information 107, the analysis engine 125 can be configured to generate one or more informational output signals 103. The informational output signal 103 can cause presentation of a user-intelligible feedback on a user device. In some implementations, the user-intelligible feedback includes a graphical output presented on a display of a user device such as a handheld device or wearable device. In some implementations, the user-intelligible feedback can include audio or video output presented through a user device. The user-intelligible feedback can also include haptic feedback provided, for example, via a handheld device or wearable device. In such cases, the informational output signal 103 can cause activation of a haptic interface on a corresponding user device to provide informational output to the user discreetly. For example, if the analysis engine 125 determines that a user is "tuning out" of a conversation, the user can be alerted by a haptic feedback signal to make an effort to engage in the conversation.

In some implementations, the informational output signal 103 can be configured to cause presentation of one or more messages on an application executing on a user device such as a mobile device or a wearable device. Examples of user interfaces of such an application are depicted in FIGS. 2A-2E. FIGS. 2A-2C show example user interfaces for providing informational output on a conversation of the user. For example, if the user is determined to be not participating in the conversation, the example user interface 200 (shown in FIG. 2A) can be used display an alert 202 and/or a suggestion 204 to participate more. In some implementations, the interface 200 can include a query 206 seeking user-input on whether to continue providing informational output on the conversation. This provides the user a choice to opt-in or opt-out of receiving additional informational output. In another example, if a user is determined to be speaking too much in a conversation, an example interface 220 (shown in FIG. 2B) can be used to provide corresponding alerts and/or suggestions to the user. In some implementations, a user interface can include a control 224 that allows the user to access and adjust settings for a hearing assistance device. This can be done, for example, directly from the application that causes the presentation of the corresponding user-interface, or by launching another application associated with the hearing assistance device. In some implementations, if the user is performing satisfactorily in a social interaction, positive feedback can be provided to the user via a user interface such as the interface 230 (as shown in FIG. 2C). Such positive feedback may encourage the user to maintain the level of engagement in the corresponding social interaction.

FIGS. 2D and 2E depict example user interfaces 240 and 250, respectively, for providing informational output and other information on a user's social interactions over a period of time. For example, the interface 240 (shown in FIG. 2D) shows a message 242 on a number of times the user has engaged in social interactions in a given time period, and/or information 244 on how the user's performance compares to a personal goal or other standard. The interface 240 can also include an option 248 that allows the user to change the personal goal or objective for an upcoming (or current) time period. In another example, if the user is not engaging in enough social interactions, an example interface 250 (shown in FIG. 2E) can be used to provide informational output accordingly, and present suggestions 252 for remedial action. The interface 250 can also be configured to present an option 254 of providing a recommendation that the user can go to. In some implementations, the suggestions can be provided using a trained machine learning process, as described above.

Even though FIG. 1 depicts the analysis engine 125 as a part of the server 122, in some implementations, at least a portion of the analysis engine 125 can reside on a user device such as a handheld device or wearable device. In some implementations, the entire analysis engine may be implemented on a user device. Various machine learning processes can be used by the analysis engine 125 in determining the one or more predicted ambient acoustic features. For example, one or more machine learning techniques such as linear regression, deep neural networks, naïve Bayes classifiers, and support vector machines may be used to determine a relationship between the independent variables and the dependent variables. The technology described herein can also facilitate various types of user interaction with the analysis engine 125. The interactions can be facilitated, for example, by a user interface provided via an application that executes on a user device. The application can be configured to measure one or more parameters representative of the acoustic environment of the location in which the handheld device is present. The application can also be configured to provide the measured parameters to the analysis engine 125 as at least a portion of the user-specific information 107 or location-specific information 106.

Figure 3:
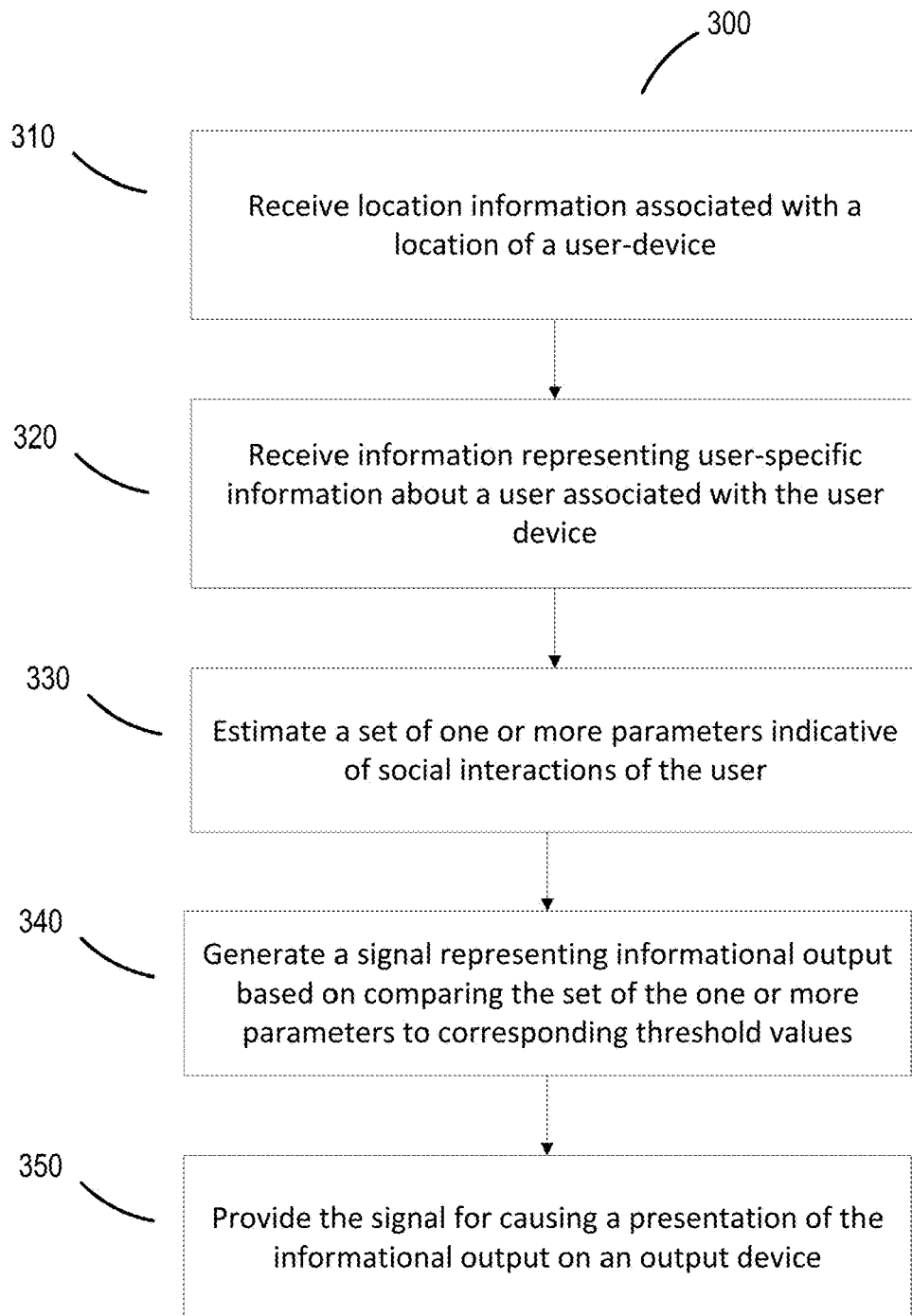
FIG. 3 is a flowchart of an example process for providing informational output on a user's social interactions.

FIG. 3 shows a flowchart of an example process 300 for providing informational output on a user's social interactions. The operations of the process 300 can be performed on one or more of the devices described above with respect to FIG. 1. For example, at least a portion of the process 300 can be performed by the analysis engine 125, which can be implemented on one or more servers 122. Portions of the process 300 (which in some cases can include the entire process) can also be performed on a handheld device 102 or another computing device.

Operations of the process 300 includes receiving location information associated with a location of a user device (310). The location information can include, for example, one or more features described with reference to the time-specific information 107 and/or location-specific information 106 described above with reference to FIG. 1. For example, the location information can include, a time stamp, GPS information, and/or information on acoustic characteristics of a location (e.g., SPL).

The operations also include receiving user-specific information about a user associated with the user device (320). The user-specific information can be received, for example, from one or more sensors. The sensors can be deployed on or more user devices associated with the user. In some implementations, the user-specific information can include information representing a number of individuals interacting with the user at the location. In some implementations, the location information includes information on dynamics of a conversation between the user and one or more of the individuals interacting with the user. The information on the number of individuals can be obtained based on detecting a presence of one or more devices associated with at least a subset of the individuals. This can be done, for example, by detecting one or more wireless signals (e.g., Bluetooth® signatures) received from the one or more devices.

Operations of the process 300 further includes estimating a set of one or more parameters indicative of social interactions of the user (330). In some implementations, the set of one or more parameters includes a metric of speech intelligibility of the user. The metric of speech intelligibility can be determined, for example, by performing speech recognition on utterances by the user, and identifying, from at least a portion of the recognized speech, a number of occurrences of one or more predetermined phrases that are indicative of difficulty in understanding speech. Examples of such predetermined phrases can include, but are not limited to, "what?", "can you repeat that?", "huh?", and other phrases typically used in asking someone to repeat something. In some implementations, the metric of speech intelligibility can then be determined as a function of the number of occurrences of the one or more predetermined phrases.

In some implementations, the set of one or more parameters indicative of social interactions of the user can include a participation metric indicative of a level of participation of the user in a conversation. The participation metric can be determined, for example, by determining a first metric indicating an amount of time that the user speaks during a predetermined time period, and determining a second metric indicating an amount of time for which the one or more of the individuals speak during the predetermined time period. In some implementations, the participation metric can then be estimated as a function of the first metric and the second metric, for example, using equations (1)-(4).

In some implementations, the set of one or more parameters indicative of social interactions of the user can include one or more mobility metric representing whereabouts of a user with respect to a predetermined location such as the user's home or work place. Such a mobility metric can represent, for example, whether and/or to what extent the user travels from the predetermined location, and may therefore be indicative of social interactions of the user. In some implementations, the mobility metric may be calculated, for example, using one or more of equations (5)-(11).

In some implementations, estimating the set of one or more parameters indicative of the social interactions of the user can also include obtaining one or more metrics representing a physiological condition of the user, and estimating the set of one or more parameters based also on the one or more metrics. The one or more metrics representing the physiological condition of the user can include, for example, a heart rate, a heart rate variability, an electrocardiogram (EKG) metric, an electroencephalogram (EEG) metric, body temperature, galvanic skin resistance (GSR), and one or more metrics associated with a motion of the user. In some implementations, the set of one or more parameters indicative of the social interactions of the user can include, for example, at least one parameter indicative of a stress level of the user, and/or at least one parameter indicative of an engagement level of the user.

Operations of the process 300 also includes generating a signal representing informational output based on comparing the set of one or more parameters to corresponding threshold values (340). In some implementations, the threshold values can correspond to user-defined goals, and/or standards representing predefined social norms. In some implementations, the informational output includes one or more instructions for the user. The informational output can include, for example, one or more of an audio, a video, an image, text, or a haptic feedback.

Operations of the process 300 can also include providing the signal for causing a presentation of the informational output on an output device (350). The information can be presented, for example, on a user-interface displayed on a computing device (e.g., a smartphone, tablet computer, a wearable device, or a desktop or laptop computer) of the user. The user interfaces can include any of the interfaces described with reference to FIGS. 2A-2E. In some implementations, the set of one or more parameters indicative of the social interactions of the user may be stored on a storage device. The set of one or more parameters can be stored linked with the location information. In some implementations, a machine learning process may be trained using the stored data, for example, to provide to s user location recommendations for social interactions.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

In some implementations, an API (e.g., a RESTful API with JSON/XML output) and/or an embeddable plug-in, can be configured to interact with the analysis engine 125. The API or plug-in can be configured to forward queries about by venues to the analysis engine, and receive, for example, a JavaScript object of acoustics-related data (e.g., measurements, predictions, or tips). This can allow third-party websites and applications to be powered by the analysis engine 125.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments not specifically described herein are also within the scope of the following claims. Elements of different implementations described herein may be combined to form other embodiments not specifically set forth above. Elements may be left out of the structures described herein without adversely affecting their operation. Further-more, various separate elements may be combined into one or more individual elements to perform the functions described herein.

What is claimed is:

1. A computer-implemented method comprising:
receiving location information associated with a location of a user-device, the location information comprising information representing a number of individuals interacting with a user of the user-device at the location;
receiving, from one or more sensor devices, user-specific information about the user associated with the user device;
estimating, by one or more processors, based on (i) the user-specific information and (ii) the location information, a set of one or more parameters indicative of social interactions of the user, the one or more parameters indicating, at least in part,
(i) a participation metric indicative of a relative amount of time the user speaks in a conversation with the number of individuals, and
(ii) a social outing metric indicative of a measure of spread of the user's physical locations;
determining that the relative amount of time the user speaks in the conversation with the number of individuals satisfies a first threshold condition;
determining that the measure of spread of the user's physical locations satisfies a second threshold condition;
responsive to determining that the relative amount of time the user speaks in the conversation with the number of individuals satisfies the first threshold condition, and determining that the measure of spread of the user's physical locations satisfies the second threshold condition, generating a signal representing informational output regarding the user's participation in the conversation and participation in social outings; and
presenting the informational output on a user-interface displayed on an output device, the user-interface configured to provide feedback to the user regarding the user's participation in the conversation and participation in social outings.

2. The method of claim 1, wherein the user-specific information includes information on dynamics of a conversation between the user and one or more of the number of individuals interacting with the user.

3. The method of claim 1, further comprising obtaining the information on the number of individuals based on detecting a presence of one or more devices associated with at least a subset of the individuals.

4. The method of claim 3, wherein the presence of one or more devices is detected based on one or more wireless signals received from the one or more devices.

5. The method of claim 4, wherein the one or more wireless signals comprise a Bluetooth® signature of a corresponding device.

6. The method of claim 1, wherein the set of one or more parameters indicative of social interactions of the user include a metric of speech intelligibility of the user.

7. The method of claim 6, wherein determining the metric of speech intelligibility comprises:
performing speech recognition on utterances by the user;
identifying, from at least a portion of the recognized speech, a number of occurrences of one or more predetermined phrases that are indicative of difficulty in understanding speech; and
determining the metric of speech intelligibility as a function of the number of occurrences of the one or more predetermined phrases.

8. The method of claim 1, wherein the location information includes a sound pressure level (SPL) at the location.

9. The method of claim 1, wherein determining the participation metric comprises:
determining a first metric indicating an amount of time that the user speaks during a predetermined time period;
determining a second metric indicating an amount of time for which the one or more of the individuals speak during the predetermined time period; and
estimating the participation metric as a function of the first metric and the second metric.

10. The method of claim 1, further comprising comparing the participating metric to a threshold value in estimating the set of one or more parameters indicative of the social interactions of the user.

11. The method of claim 1, wherein estimating the set of one or more parameters indicative of the social interactions of the user further comprises:
obtaining one or more metrics representing a physiological condition of the user; and
estimating the set of one or more parameters based also on the one or more metrics.

12. The method of claim 11, wherein the one or more metrics representing the physiological condition of the user includes one or more of: a heart rate, a heart rate variability, an electrocardiogram (EKG) metric, an electroencephalogram (EEG) metric, body temperature, galvanic skin resistance (GSR), and one or more metrics associated with a motion of the user.

13. The method of claim 1, wherein the set of one or more parameters indicative of the social interactions of the user comprises at least one parameter indicative of a stress level of the user.

14. The method of claim 1, wherein the set of one or more parameters indicative of the social interactions of the user comprises at least one parameter indicative of an engagement level of the user.

15. The method of claim 1, wherein informational output includes one or more instructions for the user.

16. The method of claim 1, wherein the informational output comprises one or more of: an audio, a video, an image, text, or a haptic feedback.

17. The method of claim 1, wherein the output device includes one of: a smartphone, a tablet device, a wearable device, or a hearing-assistance device.

18. The method of claim 1, further comprising storing the set of one or more parameters indicative of the social interactions of the user on a storage device, wherein the set of one or more parameters is linked with the location information.

19. A system comprising:
an analysis engine comprising one or more processing devices, the analysis engine configured to:
receive location information associated with a location of a user-device, the location information comprising information representing a number of individuals interacting with a user of the user-device at the location,
receive, from one or more sensor devices, user-specific information about the user associated with the user device,
estimate, based on (i) the user-specific information and (ii) the location information, a set of one or more parameters indicative of social interactions of the user, the one or more parameters indicating, at least in part,
(i) a participation metric indicative of a relative amount of time the user speaks in a conversation with the number of individuals, and
(ii) a social outing metric indicative of a measure of spread of the user's physical locations,
determine that the relative amount of time the user speaks in the conversation with the number of individuals satisfies a first threshold condition,
determine that the measure of spread of the user's whereabouts satisfies a second threshold condition,
responsive to determining that the relative amount of time the user speaks in the conversation with the number of individuals satisfies the first threshold condition, and determining that the measure of spread of the user's whereabouts satisfies the second threshold condition, generate a signal representing informational output regarding the user's participation in the conversation and participation in social outings, and
present the informational output on a user-interface displayed on an output device, the user-interface configured to provide feedback to the user regarding the user's participation in the conversation and participation in social outings.

20. The system of claim 19, wherein the user-specific information includes information on dynamics of a conversation between the user and one or more of the number of individuals interacting with the user.

21. The system of claim 19, wherein the set of one or more parameters indicative of social interactions of the user include a metric of speech intelligibility of the user.

22. The system of claim 19, wherein the set of one or more parameters indicative of social interactions of the user includes a participation metric indicative of a level of participation of the user in a conversation with one or more individuals.

23. The system of claim 19, wherein the set of one or more parameters indicative of the social interactions of the user is estimated by:
obtaining one or more metrics representing a physiological condition of the user; and
estimating the set of one or more parameters based also on the one or more metrics.

24. The system of claim 19, wherein the set of one or more parameters indicative of the social interactions of the user comprises at least one parameter indicative of a stress level of the user.

25. The system of claim 19, wherein the set of one or more parameters indicative of the social interactions of the user comprises at least one parameter indicative of an engagement level of the user.

26. The system of claim 19, wherein the output device includes one of: a smartphone, a tablet device, a wearable device, or a hearing-assistance device.

27. The system of claim 19, further comprising a storage device for storing the set of one or more parameters indicative of the social interactions of the user, wherein the set of one or more parameters is linked with the location information.

28. One or more non-transitory machine-readable storage devices having encoded thereon computer readable instructions for causing one or more processors to perform operations comprising:
receiving location information associated with a location of a user-device, the location information comprising information representing a number of individuals interacting with a user of the user-device at the location;
receiving, from one or more sensor devices, user-specific information about the user associated with the user device;
estimating based on (i) the user-specific information and (ii) the location information, a set of one or more parameters indicative of social interactions of the user, the one or more parameters indicating, at least in part,
(i) a participation metric indicative of a relative amount of time the user speaks in a conversation with the number of individuals, and
(ii) a social outing metric indicative of a measure of spread of the user's physical locations;
determining that the relative amount of time the user speaks in the conversation with the number of individuals satisfies a first threshold condition, and
determining that the measure of spread of the user's whereabouts satisfies a second threshold condition;
responsive to determining that the relative amount of time the user speaks in the conversation with the number of individuals satisfies the first threshold condition, and determining that the measure of spread of the user's whereabouts satisfies the second threshold condition, generating a signal representing informational output regarding the user's participation in the conversation and participation in social outings; and
presenting the informational output on a user-interface displayed on an output device, the user-interface configured to provide feedback to the user regarding the user's participation in the conversation and participation in social outings.

29. The one or more non-transitory machine-readable storage devices of claim 28, wherein the set of one or more parameters indicative of social interactions of the user include a metric of speech intelligibility of the user.

30. The one or more non-transitory machine-readable storage devices of claim 29, further comprising instructions for:
performing speech recognition on utterances by the user;
identifying, from at least a portion of the recognized speech, a number of occurrences of one or more predetermined phrases that are indicative of difficulty in understanding speech; and
determining the metric of speech intelligibility as a function of the number of occurrences of the one or more predetermined phrases.

31. The one or more non-transitory machine-readable storage devices of claim 28, wherein the set of one or more parameters indicative of social interactions of the user includes a participation metric indicative of a level of participation of the user in a conversation with one or more of the number of individuals.

32. The one or more non-transitory machine-readable storage devices of claim 31, further comprising instructions for:
determining a first metric indicating an amount of time that the user speaks during a predetermined time period;
determining a second metric indicating an amount of time for which the one or more of the individuals speak during the predetermined time period; and
estimating the participation metric as a function of the first metric and the second metric.

33. The method of claim 1, wherein estimating the social outing metric comprises:

sampling GPS coordinates of the user over time, each GPS coordinate comprising first and second coordinate values;

computing a first standard deviation of differences between each first coordinate value and a mean of the first coordinate values;

computing a second standard deviation of differences between each second coordinate value and a mean of the second coordinate values; and computing a value indicative of a confidence interval for the GPS coordinates of the user as a function of the first and the second standard deviations.

34. The system of claim 19, wherein estimating the social outing metric comprises:

sampling GPS coordinates of the user over time, each GPS coordinate comprising first and second coordinate values;

computing a first standard deviation of differences between each first coordinate value and a mean of the first coordinate values;

computing a second standard deviation of differences between each second coordinate value and a mean of the second coordinate values; and computing a value indicative of a confidence interval for the GPS coordinates of the user as a function of the first and the second standard deviations.

35. The one or more non-transitory machine-readable storage devices of claim 28, wherein estimating the social outing metric comprises:

sampling GPS coordinates of the user over time, each GPS coordinate comprising first and second coordinate values;

computing a first standard deviation of differences between each first coordinate value and a mean of the first coordinate values;

computing a second standard deviation of differences between each second coordinate value and a mean of the second coordinate values; and computing a value indicative of a confidence interval for the GPS coordinates of the user as a function of the first and the second standard deviations.

* * * * *